United States Patent [19]

Aoki

[11] Patent Number: 5,099,229
[45] Date of Patent: Mar. 24, 1992

[54] INDICATION DISPLAY UNIT FOR A VEHICLE

[75] Inventor: Kunimitsu Aoki, Shizuoka, Japan

[73] Assignee: Yazaki Corporation, Tokyo, Japan

[21] Appl. No.: 328,385

[22] Filed: Mar. 24, 1989

[30] Foreign Application Priority Data

Apr. 1, 1988 [JP] Japan .................. 63-42938[U]

[51] Int. Cl.⁵ .............................. G09G 3/02
[52] U.S. Cl. ........................ 340/705; 340/980; 353/13; 353/14; 359/630
[58] Field of Search .............. 340/705, 980; 353/13, 353/14; 350/174

[56] References Cited

U.S. PATENT DOCUMENTS

| | | | |
|---|---|---|---|
| 2,466,338 | 4/1949 | Traub | 358/239 |
| 4,613,200 | 9/1986 | Hartman | 350/174 |
| 4,831,366 | 5/1989 | Iino | 340/705 |

Primary Examiner—Jin F. Ng
Assistant Examiner—Dov Popovici
Attorney, Agent, or Firm—Armstrong, Nikaido, Marmelstein, Kubovcik & Murray

[57] ABSTRACT

An indication display unit for a vehicle according to the present invention comprises an indicator secured to a ceiling in a car room for displaying images indicated thereon, and a reflecting means disposed forwardly of a driver seat and formed with a reflecting surface for reflecting the above indicated image, characterized in that the ratio of the forwardly side length of an indicated pattern on the indicator to the rearwardly side length thereof is settled equal to that of the distance between a predetermined visual position on the driver seat side and the forwardly side length of the indicated pattern to the distance between the visual position and the rearwardly side length of the indicated pattern respectively through the reflective surface therebetween so as to acquire the indicated image without distortion.

1 Claim, 2 Drawing Sheets

TO THE REFLECTING SURFACE

INDICATION DISPLAY UNIT FOR A VEHICLE

BACKGROUND OF THE INVENTION

1. Field of the Invention

The present invention generally relates to an indication display unit for a vehicle wherein indicated various information concerning driving operation such as revolution frequency of engine, residual fuel quantity and so on are visually observed by the images reflected on a reflecting member, and more particularly, to an indication display unit suitably for so-called a head-up display wherein the indicated images are projected to the reflecting member to be visually observed by a driver, while being overlapped with an outside scenery viewed through the windshield thereof.

2. Description of the Prior Art

Referring to FIG. 6, there is illustrated an example of a conventional indication display unit for a vehicle which employs the above-mentioned head-up display.

In FIG. 6, the numeral 11 represents a projector, secured to a ceiling 10 in the car room, for indicating various vehicle information such as a car speed or the like. A semi-translucent mirror generally designated at 12 is provided on a dashboard 30 disposed in front of a windshield 20. An image 13 indicated on the projector 11 is projected to the semi-translucent mirror 12 to be reflected thereon so as to overlappedly observed with an outside scenery viewed through the windshield 20 from the direction of the driver seat.

By virtue of this arrangement, the driver is allowed to visually recognize the vehicle operational information such as the engine speed, residual fuel quantity and so on without averting his visual field to a greater extent during the traveling.

Since the projector 11 is attached to a car room ceiling 10, it is possible to provide more space for accommodating other instruments in the dashboard 30. With this arrangement, a distance from the projector 11 to the semi-translucent mirror 12 becomes larger, and the projected image can be observed at a farther position with a high visual recognizability.

In the case that, as described above, the projector is mounted on the car room ceiling, however, the projector is normally provided just above the driver seat due to optical constraints, and as a result, the prior art indication display unit with the above arrangement presents such problems that the clearance between the driver's head and the lower portion of the projector is caused to decrease, thereby some cooped-up feeling is given to the driver.

SUMMARY OF THE INVENTION

It is a primary object of the present invention to eliminate the above-mentioned problems providing an indication display unit for a vehicle, which comprises an indicator secured to a ceiling in the car room for displaying the indicated image, and a reflecting member formed with a reflecting surface on which the indicated image is reflected, and disposed forwardly of the driver seat, whereby the indicated image is virtually observed behind the reflecting plate, characterized in that an displaying surface of the indicator is provided within the same plane as that of the car room ceiling, and a ratio of a forwardly side length of an indicated pattern on the indicator to a rearwardly side length thereof is settled equal to a ratio of the distance between a predetermined visual position on the driver seat side and the forwardly side length of the indicated pattern to the distance between the visual position and the rearwardly side length of the same indicated pattern respectively through the same reflective surface therebetween.

Since the displaying surface of the indicator is provided within the same plane as that of the car room ceiling, a fairly large clearance above the driver can be obtained. Furthermore, variations in the indicated pattern can serve to correct the distortion of the indicated image which is caused by the angle interposed between the displaying surface of the indicator and the visual line directed from the visual point to the indicator by way of the reflecting surface.

BRIEF DESCRIPTION OF THE DRAWINGS

Other objects and advantages of the invention will become apparent through the following explanations in conjunction with the accompanying drawings, in which.

DETAILED DESCRIPTION OF THE PREFERRED EMBODIMENTS

Figure 1:
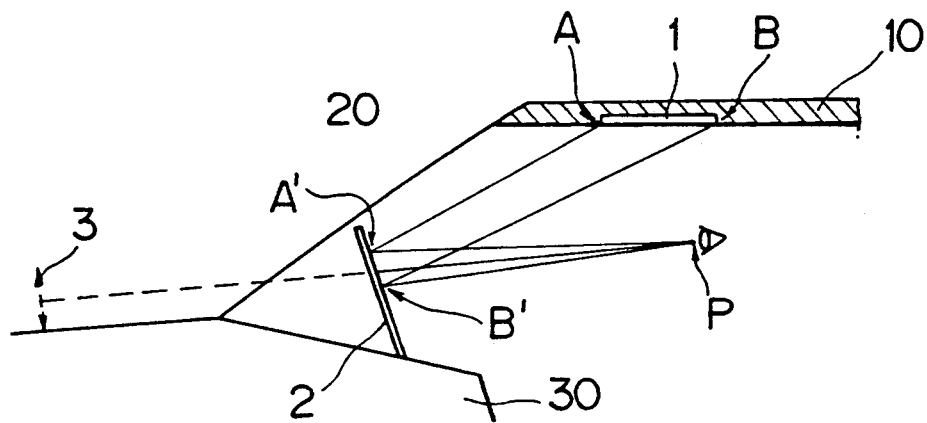
FIG. 1 is an illustration showing an embodiment of an indication display unit for a vehicle according to the present invention.
Figure 2:
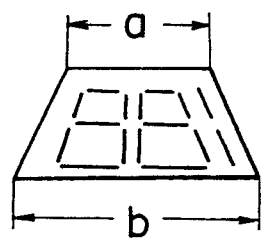
FIG. 2 is a diagram illustrating one example of an indicated pattern to be appeared on the indicator in the foregoing embodiment.

FIG. 1 illustrates one embodiment of an indication display unit for a vehicle according to the present invention.

Referring to FIG. 1, the numeral 1 represents an indicator for indicating a car speed. The indicator 1 may be classified as a fluorescent display tube embedded in a car room ceiling above the driver seat in such a way that the plane of a displaying surface thereof is identical with that of the ceiling 10. A reflecting plate generally designated at 2 is disposed on a dashboard 30 provided in front of a windshield 20. An image 3 showing the car speed which is originally indicated on the indicator 1 is virtually recognized while being overlapped with an outside scenery forwardly of the windshield 20 when viewed from the driver seat.

Figure 7:
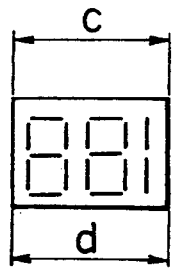
FIG. 7 is a diagram showing one example of an indicated pattern of a prior art indicator.
Figure 8:
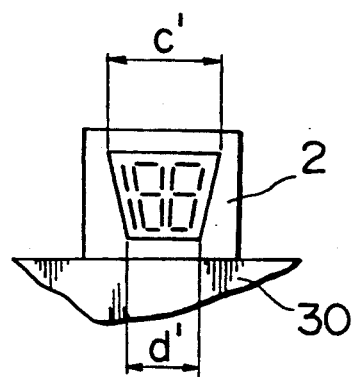
FIG. 8 is a diagram showing a state in which distortion is caused in an indicated image to be visually observed.

A position A of a forwardly side of the indicator 1, which is observed by way of a point A' on the reflecting plate 2 from a visual position P on the driver seat side, appears to be closer than a position B' of a rearwardly side of the indciator 1, which is similarly observed by way of a point B' on the reflecting plate 2. Supposing that an indicated pattern on the indicator 1 is set just like that displayed on a conventional indicator wherein, as depicted in, e.g., FIG. 7, respective lengths (c and d) of the forwardly and the rearwardly sides are equalized, and the indicated image to be visually observed comes to have the forwardly side length (c') which is, as illustrated in FIG. 8, greater than the rearwardly side length (d'), so that the distortedly displayed image is visually observed.

In order to eliminate the distortion above, the indicated pattern on the indicator 1 is varied according to the distance ($l_1$) set in the direction of the visual line between the forwardly side position A of the indicator 1 and the visual point P from a driver by way of a point A' on the reflecting plate 2, and also the distance ($l_2$) set in the direction of the visual line between the rearwardly side position B of the indicator 1 and the visual point P through a point B' on the reflecting plate 2.

A ratio of the forwardly side length (a) to the rearwardly side length (b) is expressed by the following formula;

$$a/b = l_1/l_2$$

Figure 3:
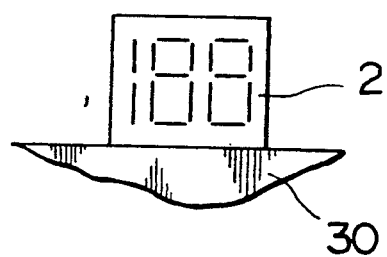
FIG. 3 is a conceptual diagram showing the relation between an angle of a visual field and a distance from a visual point to the indicated pattern in the foregoing embodiment.
Figure 4:
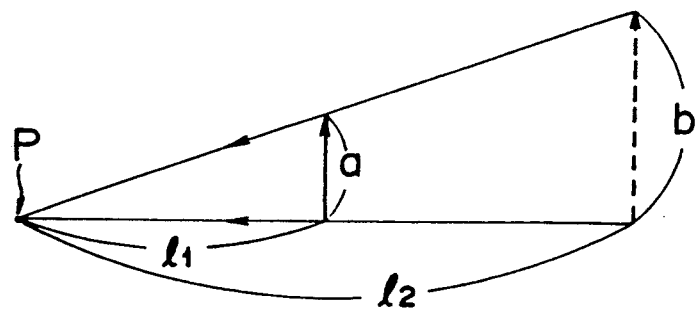
FIG. 4 is a sketch for explaining a non-distorted indicated image which is observed in the indication display unit of this invention.

Hence, since the relation between the distances and the angle from a visual field is shown in FIG. 3, when viewed from a visual point P, the forwardly side length (a) of the indicated pattern appears to be equal to the rewardly side length (b). As a result, the indicated image with no distortion can be observed as depicted in FIG. 4.

Figure 5:
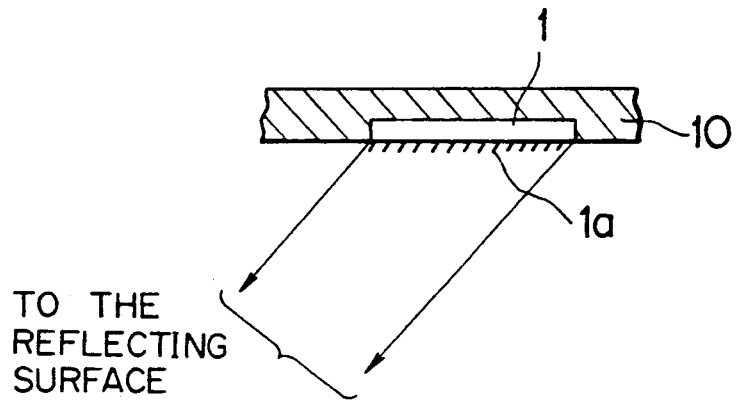
FIG. 5 is a view depicting peripheral portions of the projector is another embodiment of the present invention.
Figure 6:
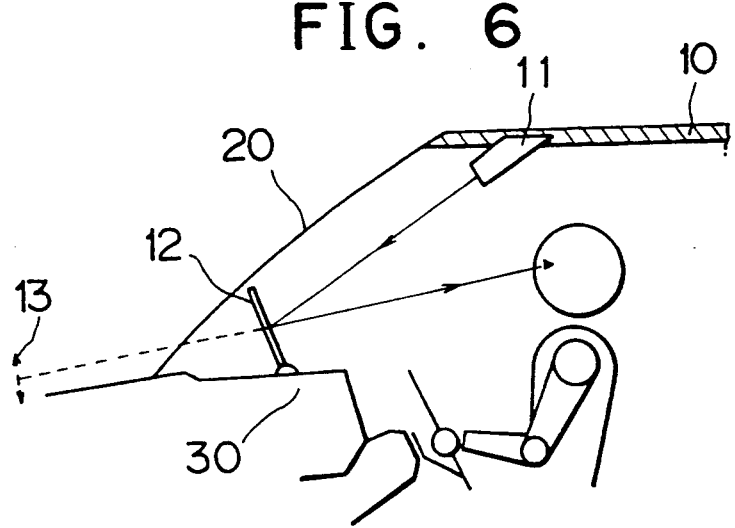
FIG. 6 is a view depicting one example of a conventional indication display unit which employs a head-up display.

Turning to FIG. 5, there is illustrated peripheral portions of the indicator in another embodiment of the present invention. In accordance with this embodiment, the front surface of the indicator 1 is, as depicted in FIG. 5, fitted with a louver 1a.

The louver 1a is used for directing light from the displaying surface of the indicator 1 in a direction towards the reflecting surface of the reflecting plate 2. In this manner, the light from the displaying surface of the indicator 1 does not excessively illuminate the interior portion of the vehicle, especially within the vicinity of the ceiling 10; instead, the light from the displaying surface of the indicator 1 is directed towards the reflecting surface of the reflecting plate 2.

In accordance with the embodiments given above, the description is concerned with the head-up display in which the image indicated on the indicator is reflected by means of the reflecting surface provided on the dashboard. The arrangement is not, however, limited to this.

In the indication display unit of the invention, the reflecting surface may be formed in a panel surface of the dashboard.

As discussed above, according to the present invention, the displaying surface of the indicator mounted on the car room ceiling is set within the same plane as that of the ceiling. The ratio of the rewardly side length of the indicated pattern on the indicator to the forwardly side length thereof is set equal to the ratio of the distance between the predetermined visual position on the driver seat side and the rewardly side of the indicated pattern of the indicator by way of the reflecting surface in the same manner to the distance between the same visual position and the forwardly side of the indicated pattern. With this arrangement, the display without distortion can be attained, and the larger clearance above the driver can also be obtained. The indication display unit which never deteriorates the comfortability in the car room can thus be provided.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:
1. An indication display unit for a vehicle comprising;
   an indicator means secured to a ceiling in a car room for displaying images indicated thereon, and having a displaying surface thereof being in substantially a same plane as that of the ceiling surface; and
   a reflecting means formed with a reflecting surface for directly receiving and reflecting said indicated images from said indicator means, and said reflecting means being disposed forwardly of a driver seat, whereby said indicated image is virtually observed therebehind,
   a ratio of a forwardly side length of an indicated pattern on said indicator means to a rearwardly side length thereof being equal to a ratio of a distance between a predetermined visual position on said driver seat side and said forwardly side length of said indicated pattern to a distance between said visual position and said rearwardly side length of said indicated pattern respectively through said reflecting surface therebetween.

* * * * *